(12) United States Patent
Becke et al.

(10) Patent No.: US 7,520,051 B2
(45) Date of Patent: Apr. 21, 2009

(54) PACKAGING METHODS AND SYSTEMS FOR MEASURING MULTIPLE MEASURANDS INCLUDING BI-DIRECTIONAL FLOW

(75) Inventors: Craig S. Becke, London, OH (US); Lamar F. Ricks, Lewis Center, OH (US); Jamie W. Speldrich, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 117 days.

(21) Appl. No.: 11/649,988

(22) Filed: Jan. 4, 2007

(65) Prior Publication Data

US 2008/0163683 A1 Jul. 10, 2008

(51) Int. Cl.
*H05K 3/30* (2006.01)
(52) U.S. Cl. .................. 29/832; 29/854; 73/204.26
(58) Field of Classification Search .............. 73/204.26, 73/204.22; 29/832, 854
See application file for complete search history.

(56) References Cited

U.S. PATENT DOCUMENTS

| | | | |
|---|---|---|---|
| 5,631,417 A | 5/1997 | Harrington et al. ....... 73/204.26 |
| 5,743,006 A * | 4/1998 | Beratan ....................... 29/840 |
| 5,827,960 A | 10/1998 | Sultan et al. .............. 73/204.26 |
| 6,591,674 B2 | 7/2003 | Gehman et al. ........... 73/204.22 |
| 6,655,207 B1 | 12/2003 | Speldrich et al. ........... 73/202.5 |
| 6,681,623 B2 | 1/2004 | Bonne et al. ................... 73/202 |
| 6,681,625 B1 | 1/2004 | Berkcan et al. ........... 73/204.23 |
| 6,725,731 B2 | 4/2004 | Wiklund et al. ........... 73/861.52 |
| 6,739,042 B2 * | 5/2004 | Thorum ....................... 29/832 |
| 6,904,907 B2 | 6/2005 | Speldrich et al. ........ 128/200.23 |
| 7,290,323 B2 * | 11/2007 | Deconde et al. ............... 29/595 |
| 2004/0163461 A1 | 8/2004 | Ito et al. |

FOREIGN PATENT DOCUMENTS

DE 102004021304 11/2005
WO WO 01/61282 A2 8/2001

OTHER PUBLICATIONS

Design and Fabrication of Artificial Lateral Line Flow Sensors; Z. Fan, J. Chen, J. Zou, D. Bullen, C. Liu, F. Delcomyn; Journal of Micromechanics and Microengineering, 12 (2002) 655-661.

\* cited by examiner

*Primary Examiner*—Jewel Thompson
(74) *Attorney, Agent, or Firm*—Kermit D. Lopez; Luis M. Ortiz (57) ABSTRACT

A packing method and system for measuring multiple measurands including bi-directional flow comprises of sampling ports arranged within a flow tube in a symmetrical pattern. The ports are arranged symmetrically with respect to the X and Y centerlines of the flow tube. In addition, the ports are also arranged symmetrical to the restrictor to minimize the amount of turbulent flow within the flow tube.

14 Claims, 7 Drawing Sheets

PACKAGING METHODS AND SYSTEMS FOR MEASURING MULTIPLE MEASURANDS INCLUDING BI-DIRECTIONAL FLOW

TECHNICAL FIELD

Embodiments are generally related to methods and systems for manufacturing and packaging combinational flow sensors. Embodiments are also related to combinational flow sensors for measuring multiple measurands including bi-directional flow.

BACKGROUND OF THE INVENTION

Flow rate control mechanisms are used in a variety of flow systems as a means for controlling the amount of fluid, gas or liquid, traveling through the system. In large-scale processing systems, for example, flow control may be used to affect chemical reactions by ensuring that proper feed stocks, such as catalysts and reacting agents, enter a processing unit at a desired rate of flow. Additionally, flow control mechanisms may be used to regulate flow rates in systems such as ventilators and respirators where, for example, it may be desirable to maintain a sufficient flow of breathable air or provide sufficient anesthetizing gas to a patient in preparation for surgery.

Typically, flow rate control occurs through the use of control circuitry responsive to measurements obtained from carefully placed flow sensors. One such flow sensor is a thermal anemometer with a conductive wire extending radially across a flow channel and known as a hot-wire anemometer. These anemometers are connected to constant current sources, which cause the temperature of the wire to increase proportionally with an increase in current. In operation, as a fluid flows through the flow channel and, thus, past the anemometer, the wire cools due to convection effects. This cooling affects the resistance of the wire, which is measured and used to derive the flow rate of the fluid. Another form of thermal anemometer flow sensor is a microstructure sensor, either a micro bridge, micro-membrane, or micro-brick, disposed at a wall of a flow channel. In this form, the sensors ostensibly measure the flow rate by sampling the fluid along the wall of the flow channel. In either application, the thermal anemometer flow sensor can be disposed in the flow channel for measuring rate of flow.

There are numerous drawbacks to these and other known flow sensors. The flow restriction mechanisms arranged inside a flow channel can create a pressure drop across the sampling ports that facilitate fluid flow into a sensing channel. This pressure drop, or pressure differential, is dependent on restrictor geometry and ingresses with flow rate. Furthermore, the fluid in the flow channel may possess an increasingly turbulent flow as the flow rate of fluid increases (i.e., an increasing non-uniform pressure and velocity across a given plane orthogonal to the direction of flow).

When combining flow sensors with other sensing measurands, it is critical not to create turbulent flow, because such flow can in turn decrease the accuracy of the flow measurement. Therefore, to overcome the forgoing shortcomings, it is desirable to provide for a suitable packing method and/or system for measuring multiple measurands including bi-directional flow.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved combinational flow sensor system and method.

It is another aspect of the present invention to provide for a method for fabricating combinational flow sensors for measuring multiple measurands including bi-directional flow.

The aforementioned aspects and other objectives and advantages can now be achieved as described herein. A method configuring for measuring multiple measurands including bi-directional flow is disclosed. In general, measurand sampling ports can be arranged within a flow tube in a symmetrical pattern. The ports are arranged symmetrically with respect to the X and Y centerlines of a flow tube. In addition, the ports are also arranged symmetrical to a flow restriction mechanism in order to minimize the amount of turbulent flow within the flow tube. In addition, the ports can be arranged symmetrical to the flow restriction mechanism (i.e., if used). The housing can be constructed such that it isolates and compartmentalizes the measurand sensing elements from one another on a circuit board.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
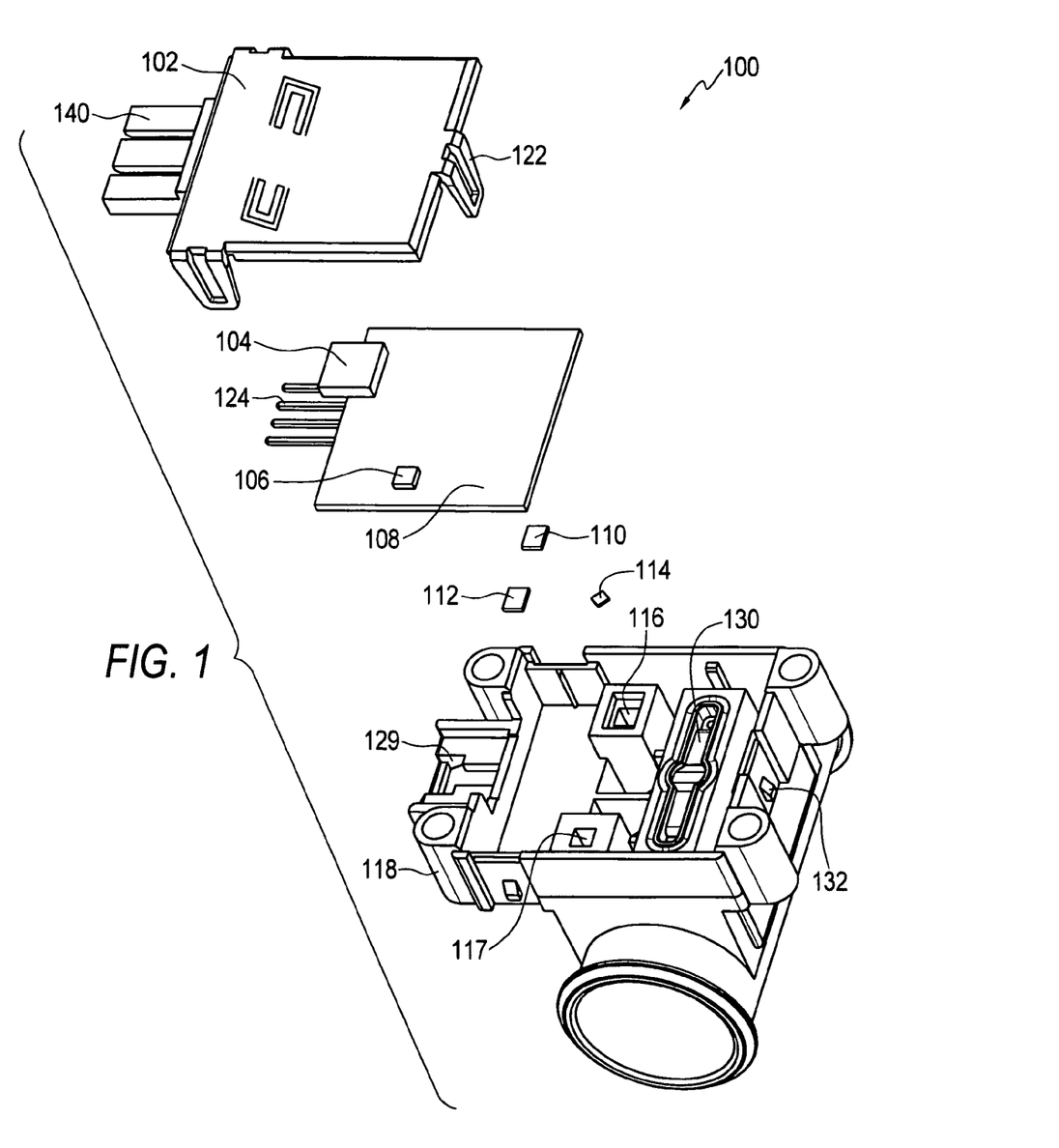
FIG. 1 illustrates a trimetric exploded view of a combinational sensor system, which can be implemented in accordance with a preferred embodiment.

FIG. 1 illustrates a trimetric exploded view of a combinational sensor system 100, which can be implemented in accordance with a preferred embodiment. A lid 102 can be disposed against the rear side of a circuit board 108. The lid 102 protects the pressure sensor 106, ASIC 112, humidity sensor 110 and airflow sensor 114 from environmental effects and clamps the pressure sensor 106, ASIC 112, humidity sensor 110, airflow sensor 114 and a flow tube 130 against a housing 118. The pressure sensor cover 104 further protects the pressure sensor 106 from external effects. The pressure sensor 106 and humidity sensors 110 are arranged on pressure compartment 117 and humidity sensor compartment 116 respectively. The housing 118 is constructed such that it isolates and compartmentalizes the pressure sensor 106, ASIC 112, humidity sensor 110 and airflow sensor 114 from one another on a circuit board 108.

Clamping can be achieved utilizing an adhesive bond. Notches 122 can be provided on the lid 102 and may be disposed to snap in place over pegs 132 of the housing 118. The lid 102 can be snapped into place over the pegs 132 and an adhesive bond may be utilize to connect the components. The lid 102 can be configured from resins similar to those utilized to configure the other sensor components. Additionally, the lid 102 also has an upper connection portion 140 which forms an electrical receptacle with a lower connection portion 129 of the housing 118 both of which houses a wire lead 124 when the lid 102 is snapped in place to form an electrical receptacle for connecting the lead 124 to external circuitry.

Figure 2:
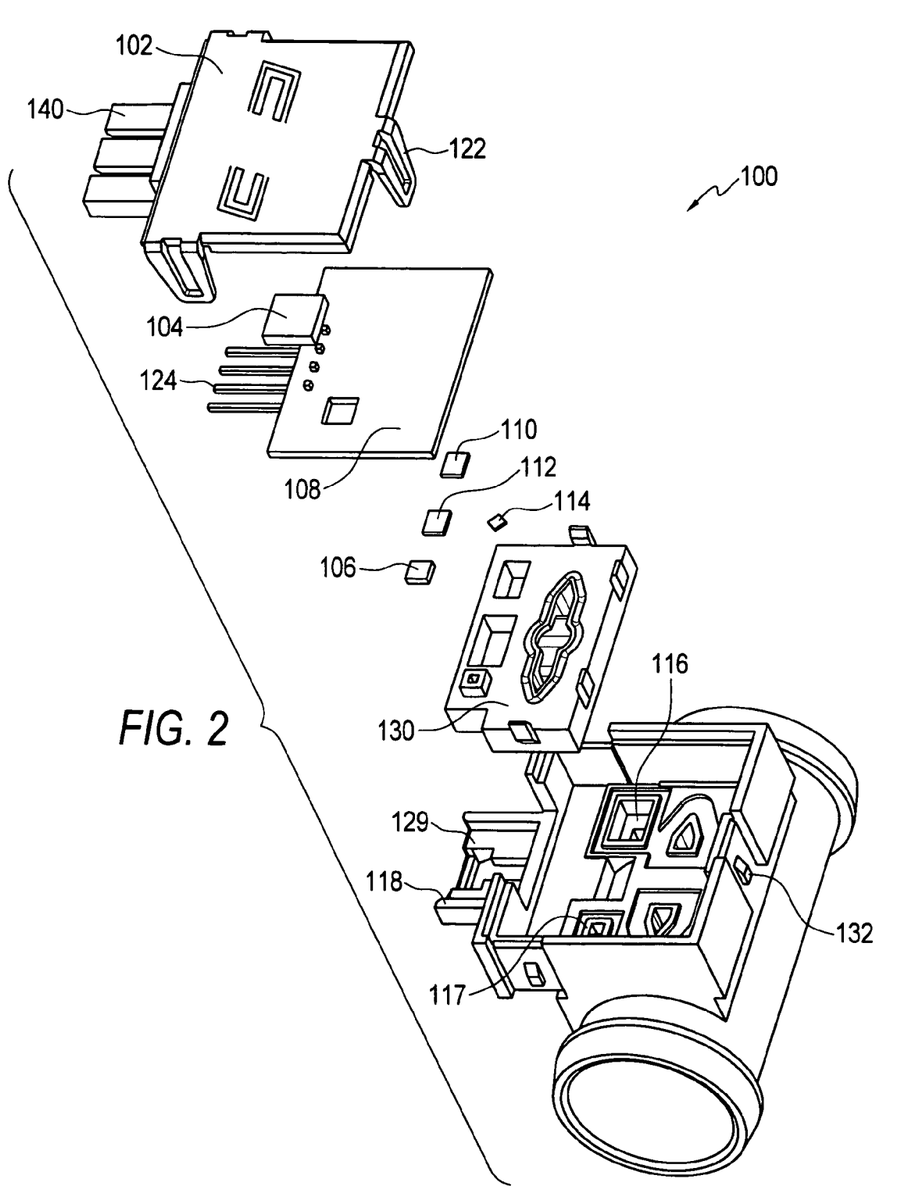
FIG. 2 illustrates a trimetric exploded view of a combinational sensor system depicting arrangement of a pressure sensor, an ASIC, a humidity sensor and an airflow sensor over a bypass flow tube, which can be implemented in accordance with a preferred embodiment.

FIG. 2 illustrates a trimetric exploded view of a combinational sensor system 100 depicting arrangement of a pressure sensor, an ASIC, a humidity sensor and an airflow sensor over a bypass flow tube, which can be implemented in accordance with a preferred embodiment. Note that in FIGS. 1-2, identical or similar parts or elements are generally indicated by identical reference numerals. For example, lid 102, upper connection portion 140, lower connection portion 129, notches 122, wire leads 124, circuit board 108, pressure sensor cover 104, pressure sensor 106, humidity sensor 110, ASIC 112 and airflow sensor 114, bypass flow tube 130, housing 118, pressure sensor compartment 117, humidity sensor compartment 116 and legs 132 depicted in FIG. 1 also appear in the system 100 configuration illustrated in FIG. 2. The pressure sensor 106, humidity sensor 110, ASIC 112 and airflow sensor 114 as depicted in FIG. 1 are arranged on the bypass flow tube 130.

Figure 3:
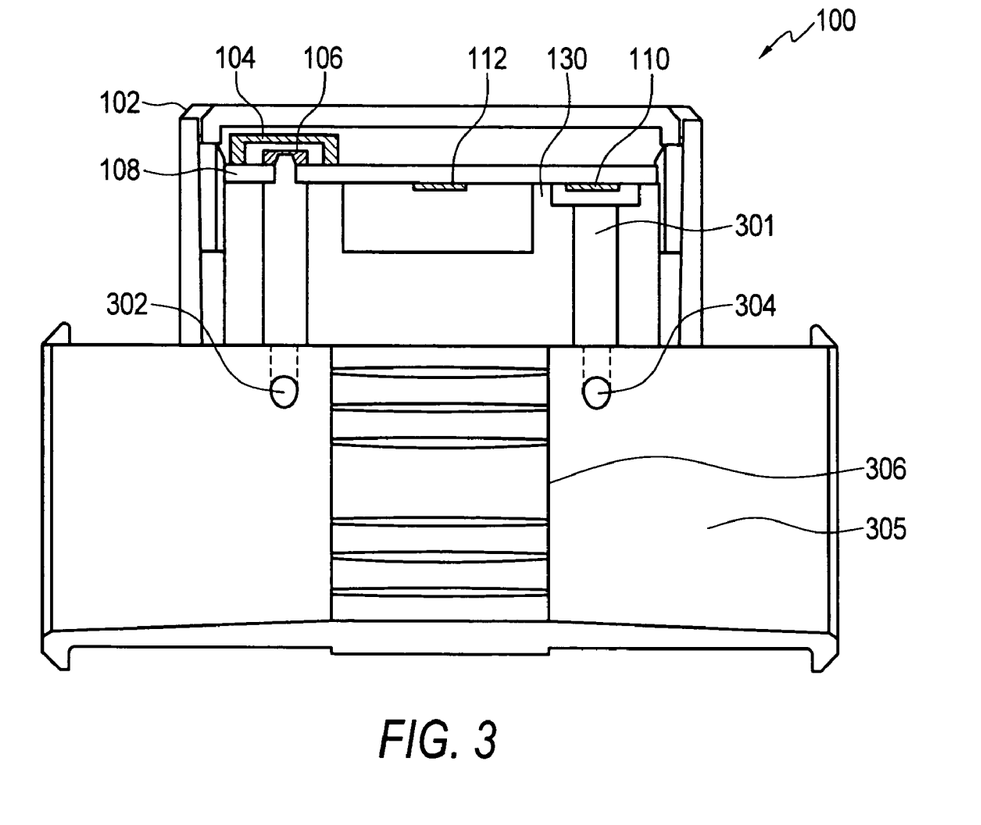
FIG. 3 illustrates a cross sectional view of a combinational sensor system showing the arrangement of a pressure sensor, an ASIC and a humidity sensor, which can be implemented in accordance with a preferred embodiment.

FIG. 3 illustrates a cross sectional view of a combinational sensor system 100 showing arrangement of a pressure sensor, an ASIC and a humidity sensor, which can be implemented in accordance with a preferred embodiment. Note that in FIG. 1 and FIG. 3, identical or similar parts or elements are generally indicated by identical reference numerals. For example circuit board 108, lid 102, pressure sensor cover 104, pressure sensor 106, ASIC 112, flow tube 130, humidity sensor 110 and sensing channel 301 depicted in FIG. 1 also appears in FIG. 3.

The sampling ports 302 and 304 are arranged symmetrically with respect to the X and Y centerlines of a flow tube 130. In addition, the ports 302 and 304 are also arranged symmetrical to a flow restriction mechanism 306 in order to minimize the amount of turbulent flow within the flow tube 130. The cross sectional view shows the arrangement of pressure sensor 106, ASIC 112 and humidity sensor 110 as depicted in FIG.1 in the sensing channel 301 and also shows the arrangement of the flow restriction mechanism 306 in the flow channel 305. Note that the flow restriction mechanism can be, for example a device such as a flow restrictor or another device such as a venturi or pitot tube for use in tapping into and sensing flow, as indicated herein. Thus, the flow restriction mechanism described herein is not limited to the configuration of a flow restrictor, but may be implemented as venture or pitot tube or other type of device, depending upon design considerations.

Figure 4:
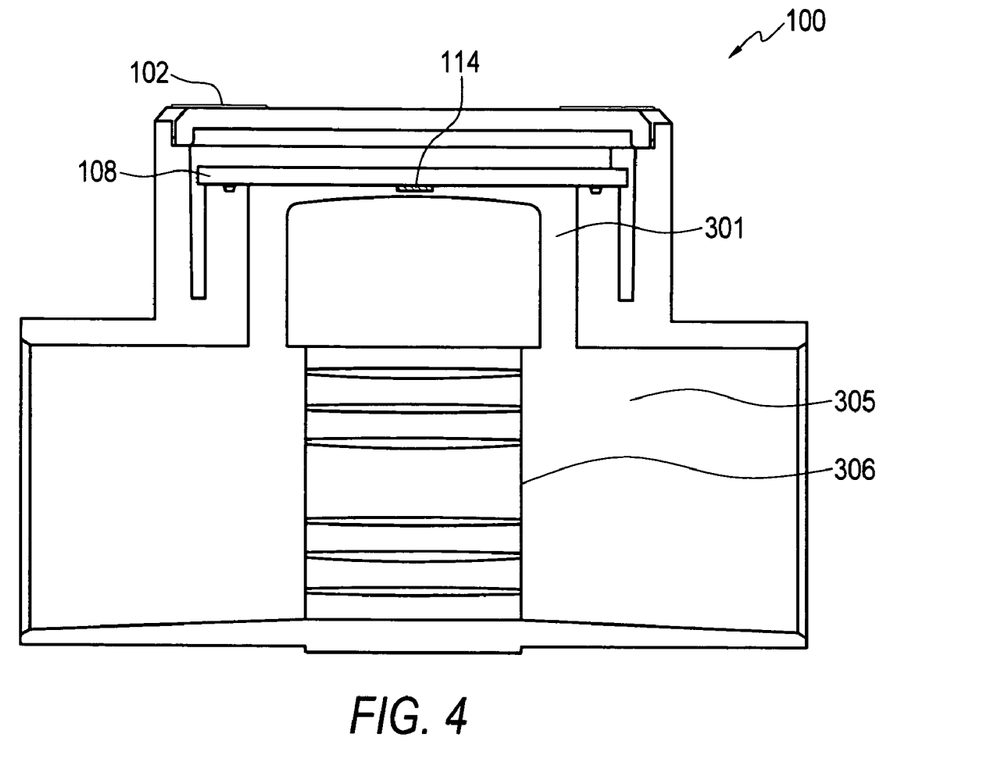
FIG. 4 illustrates a cross sectional view of a combinational sensor system showing the arrangement of an airflow sensor, which can be implemented in accordance with a preferred embodiment.

FIG. 4 illustrates a cross sectional view of a combinational sensor system 100 showing the arrangement of an airflow sensor, which can be implemented in accordance with a preferred embodiment Note that in FIGS. 1-4, identical or similar parts or elements are generally indicated by identical reference numerals. For example, circuit board 108, lid 102, airflow sensor 114, flow channel 305, sensing channel 301 and flow restriction mechanism 306 depicted in FIGS. 1-3 also appear in FIG. 4.

Figure 5:
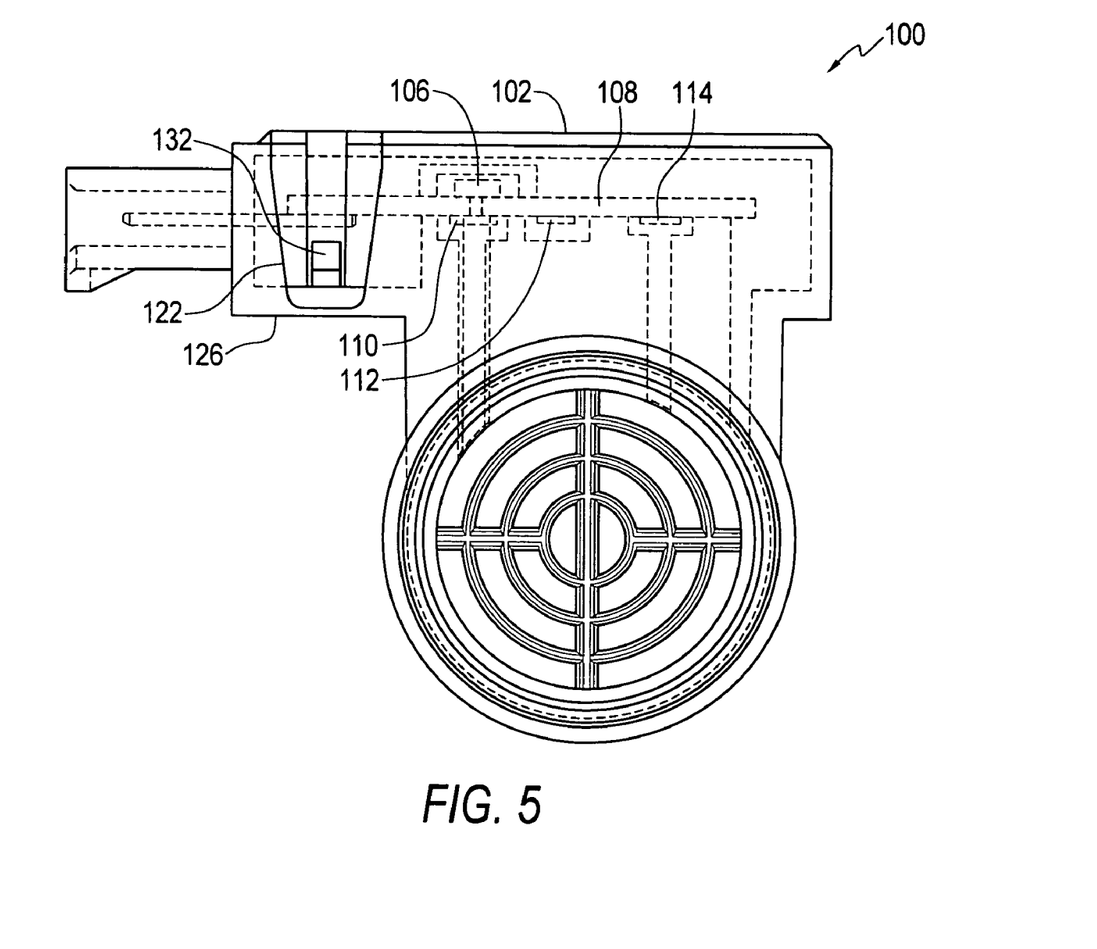
FIG. 5 illustrates a cross sectional view of a combinational sensor system showing the arrangement of a pressure sensor, an ASIC, a humidity sensor and an airflow sensor, which can be implemented in accordance with a preferred embodiment.

FIG. 5 illustrates a cross sectional view of a combinational sensor system 100 showing the arrangement of a pressure sensor, an ASIC, a humidity sensor and an airflow sensor, which can be implemented in accordance with a preferred embodiment. Note that in FIG. 1 and FIG. 5, identical or similar parts or elements are generally indicated by identical reference numerals. For example, the housing 118, notches 122, pressure sensor 106, ASIC 112, pegs 132, pressure sensor cover 104, circuit board 108 and airflow sensor 114 depicted in FIG. 1 also appears in FIG. 5.

Figure 6:
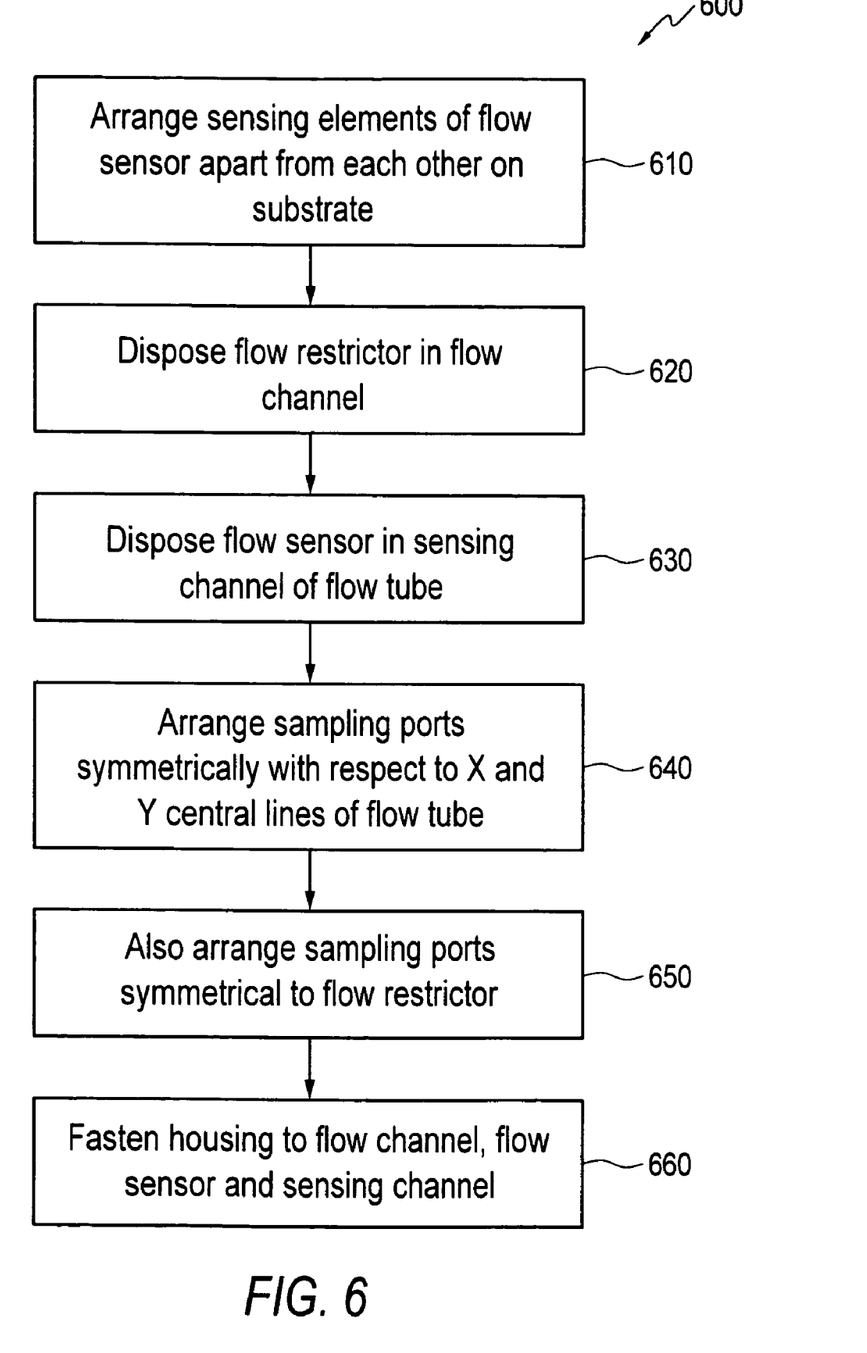
FIG. 6 illustrates a high level flow diagram of operations depicting a method for fabricating a combinational sensor with a flow restriction mechanism, in accordance with a preferred embodiment.

FIG. 6 illustrates a high level flow diagram 600 of operations depicting a method for packaging a combinational sensor system 100 with flow restriction mechanism 306 depicted in FIG. 3, in accordance with a preferred embodiment. As indicated at block 610, the pressure sensor 106, humidity sensor 110, ASIC 112 and airflow sensor 114 depicted in FIG. 1 are arranged apart from one another on a circuit board 108 depicted in FIG. 1. The housing 118 depicted in FIG. 1 can be constructed such that it isolates and compartmentalizes the pressure sensor 106, humidity sensor 110, ASIC 112 and airflow sensor 114 depicted in FIG. 1 from one another on the circuit board 108 depicted in FIG. 1.

At block 620 the flow restriction mechanism 306 is disposed in the flow channel 305 as depicted in FIG. 3 for creating a pressure drop in flow channel 305. The combinational sensor system 100 depicted in FIG. 1 having the pressure sensor 106, humidity sensor 110, ASIC 112 and airflow sensor 114 can be disposed in the sensing channel 301 depicted in FIG. 3 as illustrated at block 630. As depicted at block 640 the sampling ports 302 and 304 depicted in FIG. 3 are arranged symmetrically with respect to X and Y central lines of flow tube 130 depicted in FIG. 1. In addition at block 650 the ports 302 and 304 depicted in FIG. 3 are also arranged symmetrical to flow restriction mechanism 306 depicted in FIG. 3. Finally, as described at block 660, the housing 118 depicted in FIG. 1 can be fastened to the pressure sensor 106, humidity sensor 110, ASIC 112 and airflow sensor 114 as depicted in FIG.1, and flow channel 305 and the sensing channel 301 as depicted in FIG. 3.

Figure 7:
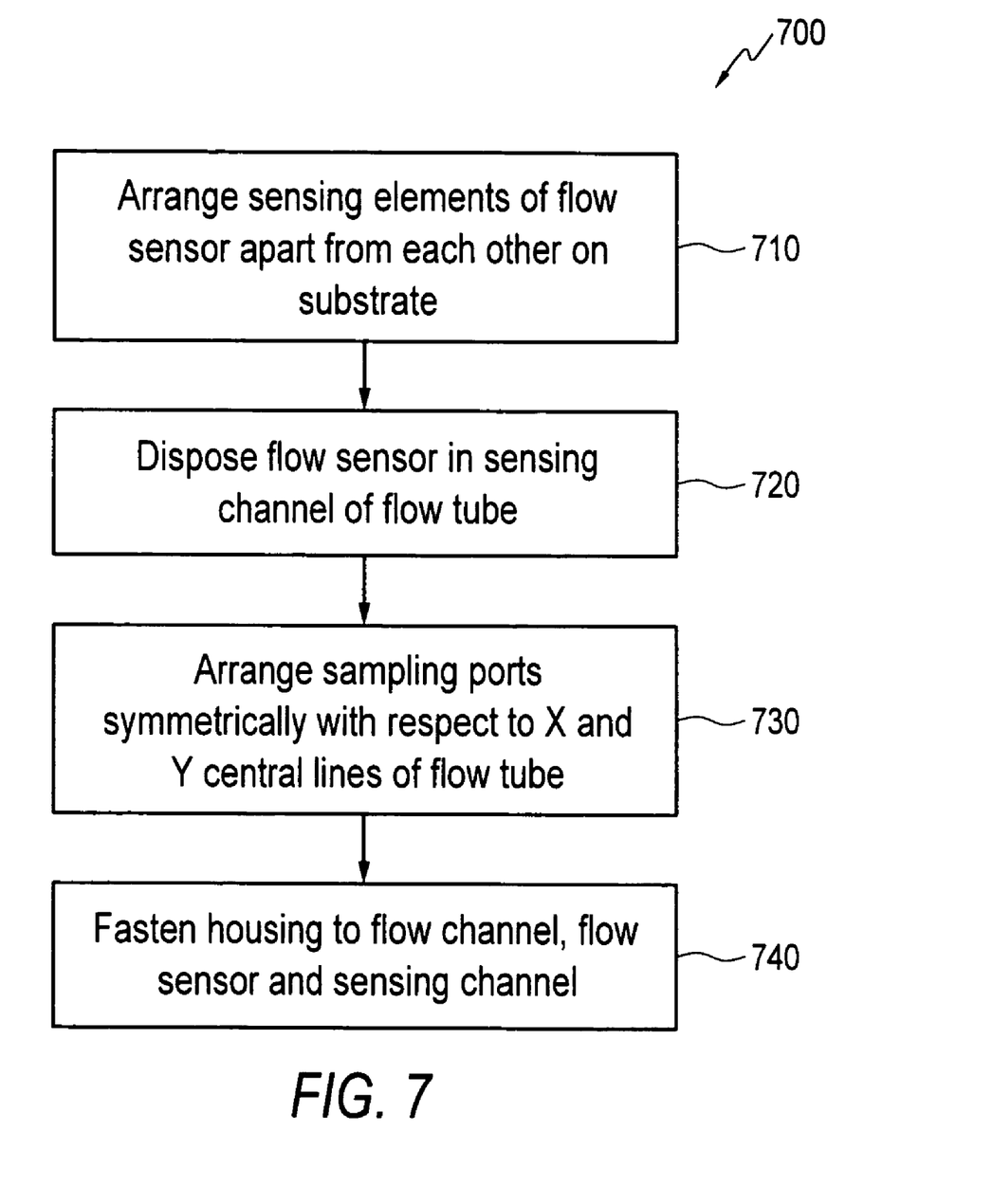
FIG. 7 illustrates a high level flow diagram of operations depicting a method for fabricating a combinational sensor without a flow restriction mechanism, in accordance with a preferred without a flow restriction mechanism.

FIG. 7 illustrates a high level flow diagram 700 of operations depicting a method for packaging a combinational sensor system 100 without a flow restriction mechanism 306 as depicted in FIG. 3, in accordance with an alternative embodiment. As depicted at block 710, the pressure sensor 106, humidity sensor 110, ASIC 112 and airflow sensor 114 depicted in FIG. 1 are arranged apart from one another on a circuit board 108 depicted in FIG. 1. The housing 118 depicted in FIG. 1 can be constructed such that it isolates and compartmentalizes the pressure sensor 106, humidity sensor 110, ASIC 112 and airflow sensor 114 depicted in FIG. 1 from one another on the circuit board 108 depicted in FIG. 1. The flow sensor module 100 depicted in FIG. 1 contains the pressure sensor 106, humidity sensor 110, ASIC 112 and airflow sensor 114 depicted in FIG. 1, and are disposed in the sensing channel 301 depicted in FIG. 3 as indicated at block 720. As depicted at block 730, the sampling ports 302 and 304 depicted in FIG. 3 can be arranged symmetrically with respect to X and Y central lines of the flow tube 130 depicted in FIG. 1. Finally, as described at block 740, the housing 118 depicted in FIG. 1 can be fastened respectively to the flow channel 305 depicted in FIG. 2, the pressure sensor 106, humidity sensor 110, ASIC 112 and airflow sensor 114 depicted in FIG. 1 and the sensing channel 301 as depicted in FIG. 3.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A packaging method for fabricating a sensor module for measuring multiple measurands including bi-directional flow, comprising:
    arranging a plurality of sensing elements apart from one another on a circuit board of a sensor having a flow tube, a flow channel and a sensing channel;
    disposing a flow restriction mechanism within said flow channel, wherein said flow restriction mechanism creates a pressure drop in said flow channel;
    disposing said sensor in said sensing channel; and
    arranging a plurality of sampling ports symmetrically with respect to X and Y central lines of said flow tube in order to thereby provide said sensor with an ability to measure multiple measurands including bi-directional flow.

2. The method of claim 1, further comprising:
    arranging said plurality of sampling ports symmetrical to said flow restriction mechanism; and
    fastening a housing to said flow channel, said sensor and said sensing channel.

3. The method of claim 2 further comprising configuring said housing to isolate and compartmentalize said plurality of sensing elements from one another on said circuit board.

4. The method of claim 1 further comprising configuring said plurality of sampling ports to comprise a pair of ports arranged upstream from said flow tube.

5. The method of claim 1 further comprising configuring said plurality of sampling ports to comprise of a pair of ports arranged downstream from said flow tube.

6. The method of claim 1 further comprising configuring said plurality of sampling ports to comprise a plurality of ports arranged downstream and upstream from said flow tube.

7. The method of claim 1 wherein said plurality of sensing elements comprises a pressure sensor, an ASIC, a humidity sensor and an airflow sensor.

8. A packaging method for fabricating a sensor module for measuring multiple measurands including bi-directional flow, comprising:
    arranging a plurality of sensing elements apart from one another on a circuit board of a sensor having a flow tube, a flow channel and a sensing channel;
    disposing a flow restriction mechanism within said flow channel, wherein said flow restriction mechanism creates a pressure drop in said flow channel;
    disposing said sensor in said sensing channel;
    arranging a plurality of sampling ports symmetrically with respect to X and Y central lines of said flow tube; and
    configuring said plurality of sampling ports symmetrical to said flow restriction mechanism in order to thereby provide said sensor with an ability to measure multiple measurands including bi-directional flow.

9. The method of claim 8 further comprising fastening a housing to said flow channel, said sensor and said sensing channel.

10. The method of claim 9 further comprising configuring said housing to isolate and compartmentalize said plurality of sensing elements from one another on said circuit board.

11. The method of claim 8 further comprising configuring said plurality of sampling ports to comprise a pair of ports arranged upstream from said flow tube.

12. The method of claim 8 further comprising configuring said plurality of sampling ports to comprise of a pair of ports arranged downstream from said flow tube.

13. The method of claim 8 further comprising configuring said plurality of sampling ports to comprise a plurality of ports arranged downstream and upstream from said flow tube.

14. The method of claim 8 wherein said plurality of sensing elements comprises a pressure sensor, an ASIC, a humidity sensor and an airflow sensor.

* * * * *